US008730164B2

(12) United States Patent
Miyake (10) Patent No.: US 8,730,164 B2
(45) Date of Patent: May 20, 2014

(54) GESTURE RECOGNITION APPARATUS AND METHOD OF GESTURE RECOGNITION (75) Inventor: Yuichi Miyake, Osaka (JP)

(73) Assignee: Panasonic Corporation, Osaka (JP)

(*) Notice: Subject to any disclaimer, the term of this patent is extended or adjusted under 35 U.S.C. 154(b) by 256 days.

(21) Appl. No.: 13/265,911

(22) PCT Filed: May 23, 2011

(86) PCT No.: PCT/JP2011/002847
§ 371 (c)(1),
(2), (4) Date: Oct. 24, 2011

(87) PCT Pub. No.: WO2011/148607
PCT Pub. Date: Dec. 1, 2011

(65) Prior Publication Data
US 2012/0176303 A1 Jul. 12, 2012

(30) Foreign Application Priority Data
May 28, 2010 (JP) ................................. 2010-123556

(51) Int. Cl.
G09G 5/00 (2006.01)
G06F 3/033 (2013.01)
G09G 5/08 (2006.01)
G06K 9/00 (2006.01)

(52) U.S. Cl.
USPC ............ 345/158; 345/156; 345/157; 382/106

(58) Field of Classification Search
USPC .................... 345/156–158; 382/106
See application file for complete search history.

(56) References Cited

U.S. PATENT DOCUMENTS

| 6,111,580 A | 8/2000 | Kazama et al. | |
| 8,224,619 B2* | 7/2012 | Onishi et al. | 702/150 |
| 8,396,252 B2* | 3/2013 | El Dokor | 382/106 |
| 2009/0073117 A1 | 3/2009 | Tsurumi et al. | |
| 2009/0167682 A1 | 7/2009 | Yamashita et al. | |
| 2009/0268945 A1 | 10/2009 | Wilson et al. | |
| 2009/0315740 A1 | 12/2009 | Hildreth et al. | |

FOREIGN PATENT DOCUMENTS

| JP | 8-44490 | 2/1996 |
| WO | 2007/088942 | 8/2007 |

OTHER PUBLICATIONS

International Search Report issued Jun. 14, 2011 in corresponding International Application No. PCT/JP2011/002847.

* cited by examiner

Primary Examiner — Ilana Spar
(74) Attorney, Agent, or Firm — Wenderoth, Lind & Ponack, L.L.P.

(57) ABSTRACT

A gesture recognition apparatus (200) which controls a display device (101) based on a gesture operation performed by a user in a vicinity of a screen (101a) includes: a picture obtainment unit (201) which obtains a picture of the vicinity of the screen (101a); a direction determination unit (204) which determines, based on position information indicating a direction from the screen (101a) or the picture obtainment unit (201) toward the user, an operational direction which is a direction of a movement to be recognized as the gesture operation; a gesture recognition unit (205) which recognizes, as the gesture operation, a movement of whole or part of a body of the user in the operational direction determined by the direction determination unit, with reference to the obtained picture; and a display control unit (206) which controls the display device (101) based on the recognized gesture operation.

10 Claims, 9 Drawing Sheets

GESTURE RECOGNITION APPARATUS AND METHOD OF GESTURE RECOGNITION

TECHNICAL FIELD

The present invention relates to a gesture recognition apparatus which recognizes a movement of whole or part of the body of a user as a gesture operation and controls a display device.

BACKGROUND ART

Figure 9:
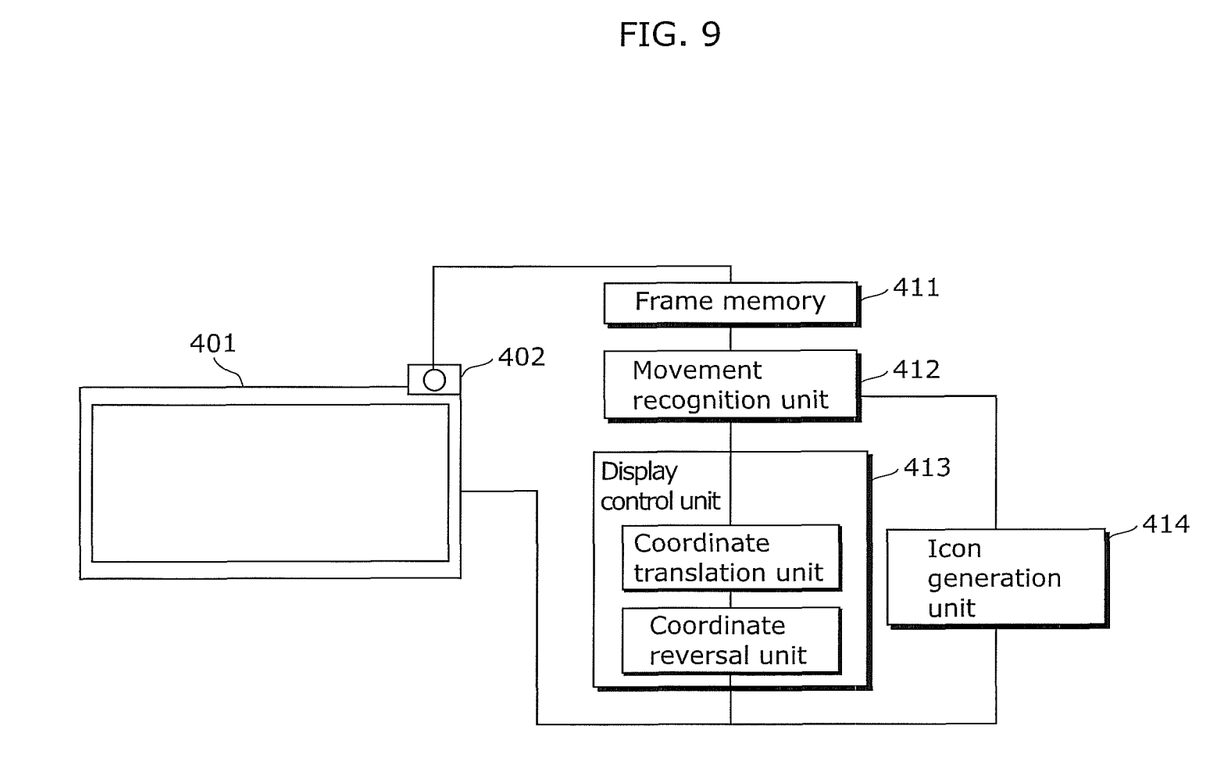
FIG. 9 is a block diagram showing a functional configuration of a conventional gesture recognition apparatus.

A gesture recognition apparatus according to a conventional technique recognizes a movement of a user (hereinafter referred to as a gesture operation) in a picture taken by a camera, by performing contour extraction, object extraction, shape change recognition, and position detection, and controls a device based on the result of the recognition (for example, see PTL 1). FIG. 9 is a block diagram showing a functional configuration of a conventional gesture recognition apparatus disclosed in PTL 1.

A screen 401 in FIG. 9 shows a variety of information or a graphical user interface (GUI) which reflects a result of a gesture operation. A camera 402 takes pictures of a gesture operation of a user. A frame memory 411 stores the pictures of the user taken by the camera 402. A movement recognition unit 412 reads the pictures from the frame memory 411 on a regular basis and recognizes a gesture operation by performing contour extraction, object extraction, shape change recognition, and position detection on the read pictures. A display control unit 413 and an icon generation unit 414 generate a GUI which reflects the result of the gesture operation by the movement recognition unit 412 and displays the GUI on the screen 401.

CITATION LIST

Patent Literature

[PTL 1] Japanese Unexamined Patent Application Publication Number 8-44490

SUMMARY OF INVENTION

Technical Problem

However, the technique disclosed in PTL 1 has a problem that operability may deteriorate depending on positions where the user performs a gesture operation.

In a specific case, when a user is far from right in front of the screen, the user views the screen from a position oblique to the screen, so that the user has some difficulty in a gesture operation in a specific direction (for example, a horizontal direction). As a result, operability deteriorates for the gesture operation in the specific direction.

In another case, when a user is far from right in front of the camera, motion detection from a taken picture may fail due to a direction of a gesture operation, so that accuracy in recognition of gesture operations deteriorates. As a result, operability deteriorates for the gesture operation in the direction.

The present invention, conceived to address the problem with the conventional technique, has an object of providing a gesture recognition apparatus which keeps high operability regardless of positions of a user who operates a display device by a gesture operation.

Solution to Problem

In order to achieve the object, a gesture recognition apparatus according to an aspect of the present invention controls a display device based on a gesture operation performed by a user in a vicinity of a screen, and includes: a picture obtainment unit configured to obtain a picture of the vicinity of the screen; a direction determination unit configured to determine an operational direction based on position information indicating a direction from the screen or the picture obtainment unit toward the user, the operational direction being a direction of a movement to be recognized as the gesture operation; a gesture recognition unit configured to recognize, as the gesture operation, a movement of whole or part of a body of the user with reference to the picture obtained by the picture obtainment unit, the movement being in the operational direction determined by the direction determination unit; and a display control unit configured to control the display device based on the gesture operation recognized by the gesture recognition unit.

In this configuration, the gesture recognition apparatus determines the operational direction based on a direction of a user viewed from the screen or the picture obtainment unit, so that the gesture recognition apparatus can keep high operability regardless of positions of the user.

Furthermore, the picture is preferably taken by a camera and the gesture recognition apparatus preferably further includes a position obtainment unit configured to obtain, as the position information, a divergence of a direction from the screen or the camera toward the user from an optical axis of the camera or a normal to the screen, and the direction determination unit is configured to determine either a horizontal direction or a vertical direction as the operational direction based on whether or not the divergence exceeds a threshold.

In this configuration, either the horizontal direction or the vertical direction is determined as the operational direction based on whether or not the divergence exceeds the threshold, so that the operational direction is determined appropriately for the user located not right in front of the screen or the camera and thus the operability is increased.

Furthermore, the divergence preferably indicates a horizontal divergence which is a divergence on a horizontal plane, and said direction determination unit is configured to determine the vertical direction as the operational direction when the horizontal divergence exceeds the threshold.

In this configuration, the vertical direction is determined as the operational direction when the horizontal divergence exceeds the threshold, so that the user viewing the screen from a position horizontally oblique to the screen can perform a gesture operation without difficulty. In addition, since not the horizontal direction but the vertical direction is determined as the operational direction when the user is horizontally away from a position right in front of the camera, deterioration of accuracy in recognition of a gesture operation is avoided and the operability is increased.

Furthermore, the divergence preferably indicates a vertical divergence which is a divergence on a vertical plane orthogonal to a horizontal plane and the screen or an imaging surface of the camera, and the direction determination unit is configured to determine the horizontal direction as the operational direction when the vertical divergence exceeds the threshold.

In this configuration, the horizontal direction is determined as the operational direction when the vertical divergence exceeds the threshold, so that the user viewing the screen from a position vertically oblique to the screen can perform a gesture operation without difficulty. In addition, since not the vertical direction but the horizontal direction is determined as the operational direction when the user is vertically away from a position right in front of the camera, deterioration of accuracy in recognition of a gesture operation is avoided and the operability is increased.

Furthermore, the direction determination unit is preferably configured to determine the threshold depending on accuracy in recognition of the gesture operation.

In this configuration, the operability is increased. For example, when operability is higher for the horizontal direction than for the vertical direction, a threshold can be determined such that the horizontal direction is determined as the operational direction as far as accurate recognition is possible. As a result, the operability is increased.

Furthermore, the camera preferably has an optical system including a fisheye lens, and the position obtainment unit is preferably configured to recognize an image of the user included in the picture obtained by the picture obtainment unit, and obtain the position information based on a distance between a position of the image of the user and a center of the picture.

In this configuration, a picture is used both for the recognition of a gesture operation and obtainment of the direction from the camera or the screen toward the user. In other words, the gesture recognition apparatus in this configuration has a more simple structure because neither an additional camera nor a position sensor is necessary for obtainment of position information.

Furthermore, the display control unit is preferably configured to shift an object displayed on the screen in the operational direction, when the gesture recognition unit recognizes the gesture operation.

In this configuration, the operational direction of the gesture operation coincides with the direction of the movement of the object displayed on the screen, so that the operability is further increased.

Furthermore, when a plurality of objects displayed on the screen are scrolled, the display control unit is preferably configured to scroll the objects displayed on the screen in the operational direction.

In this configuration, operability in scrolling objects displayed on the screen is increased. Here, the scrolling means an operation for displaying an object outside of the display area of the screen by sliding the object. The object means an element displayed on the screen or a set of such elements.

Furthermore, the display control unit is preferably configured to display the position information on the display device.

In this configuration, the user can foresee when the operational direction will change by seeing the displayed position information, so that the user can perform operations without feeling changes in operational direction abrupt.

Furthermore, a display device according to an aspect of the present invention includes the gesture recognition apparatus.

Furthermore, a method of gesture recognition according to an aspect of the present invention is a method of gesture recognition for controlling a display device based on a gesture operation performed by a user in a vicinity of a screen, and includes: obtaining a picture of the vicinity of the screen; determining an operational direction based on position information indicating a direction from the screen or a position where the picture has been taken toward the user, the operational direction being a direction of a movement to be recognized as the gesture operation; recognizing, as the gesture operation, a movement of whole or part of a body of the user with reference to the picture obtained in the obtaining, the movement being in the operational direction determined in the determining; and controlling the display device based on the gesture operation recognized in the recognizing.

The method produces the same advantageous effect as the gesture recognition apparatus.

Advantageous Effects of Invention

A gesture recognition apparatus according to an aspect of the present invention determines an operational direction based on the direction from a screen or a camera toward a user, so that operability of the gesture recognition apparatus is maintained high regardless of the position of the user.

DESCRIPTION OF EMBODIMENTS

The following describes an embodiment of the present invention with reference to the drawings.

Embodiment

Figure 1:
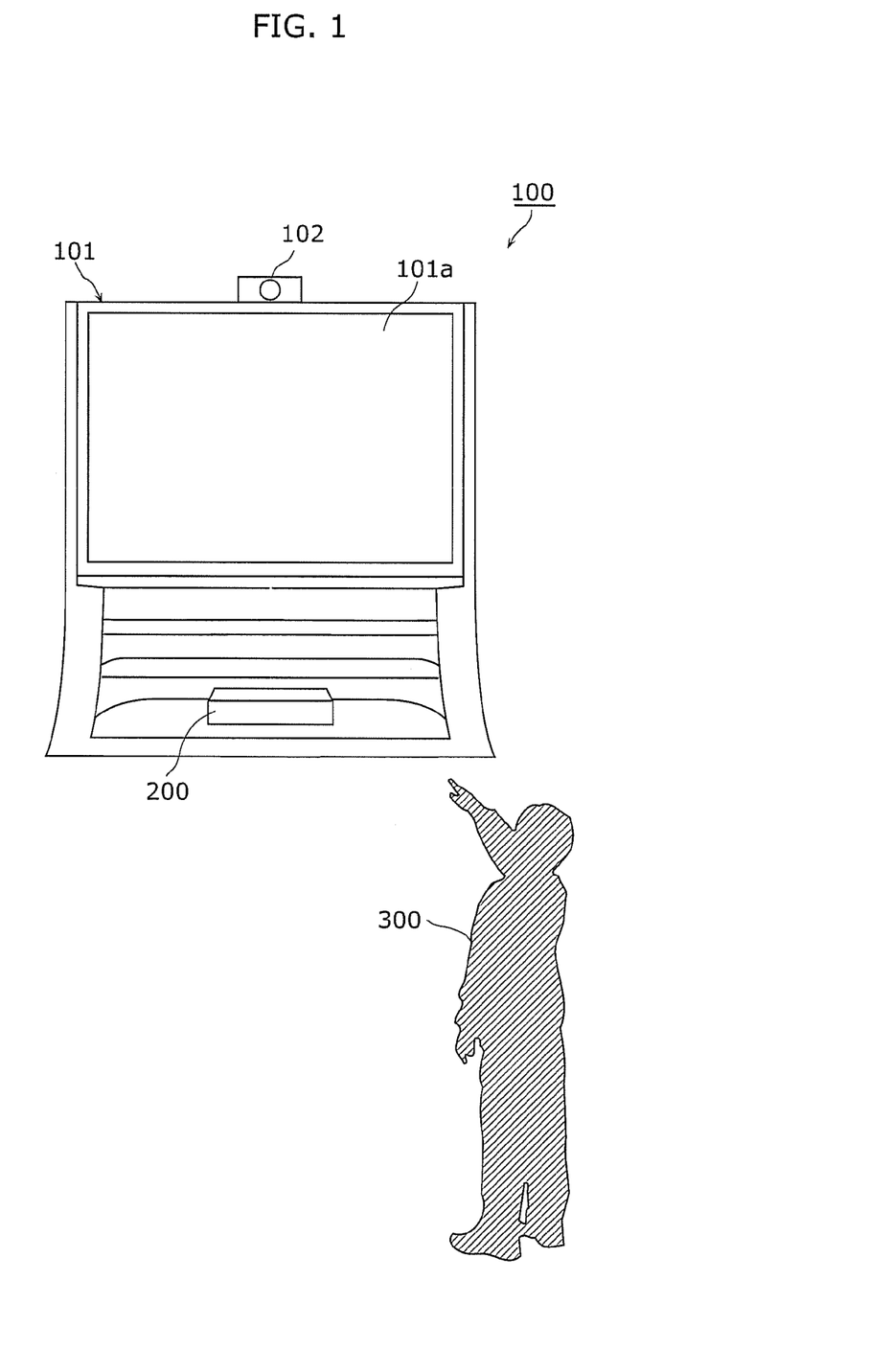
FIG. 1 is an outline view illustrating a configuration of a gesture recognition system according to an embodiment of the present invention.
Figure 2:
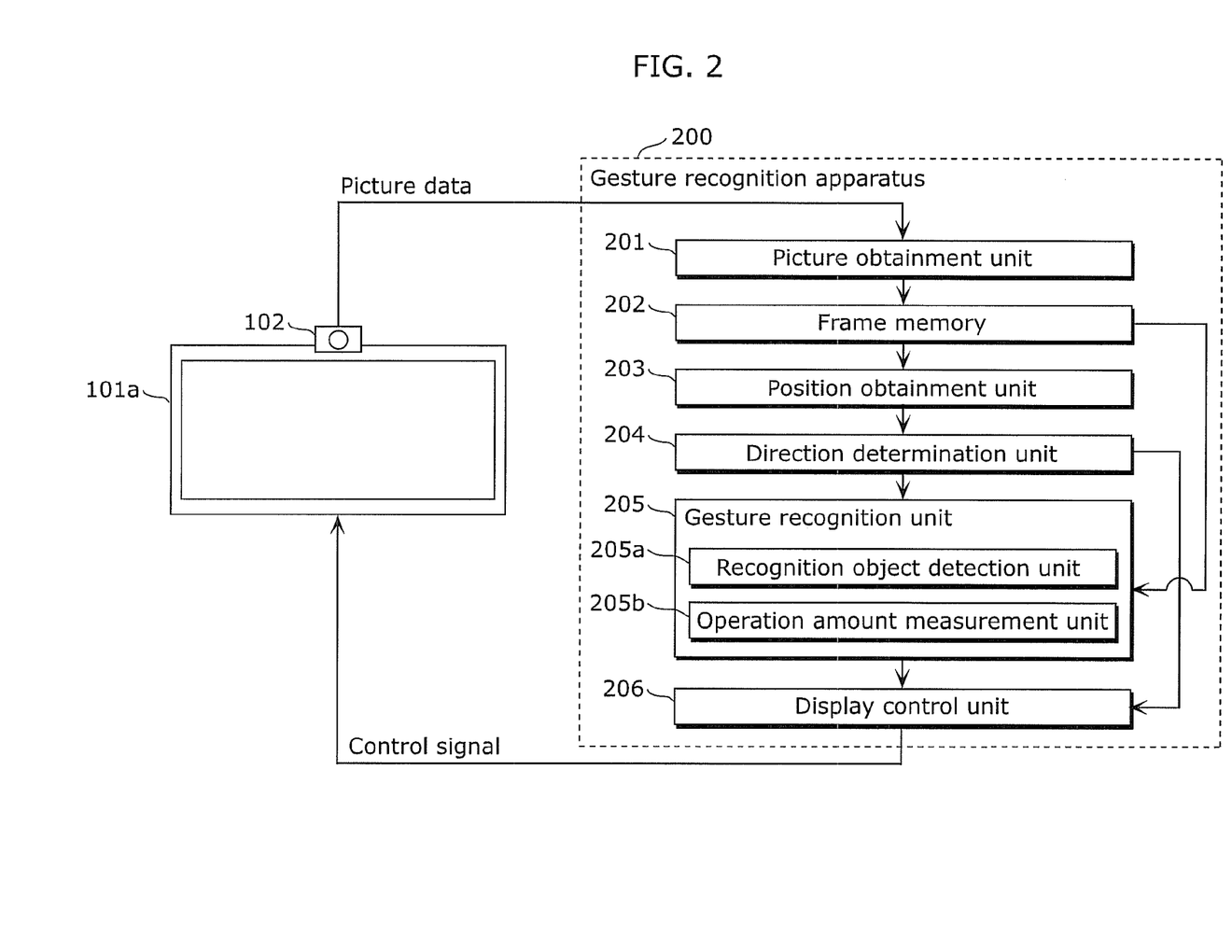
FIG. 2 is a block diagram showing a functional configuration of the gesture recognition apparatus according to the embodiment of the present invention.

FIG. 1 is an outline view illustrating a configuration of a gesture recognition system according to an embodiment of the present invention. FIG. 2 is a block diagram showing a functional configuration of the gesture recognition apparatus according to the embodiment of the present invention.

A gesture recognition system 100 includes a display device 101, a camera 102, and a gesture recognition apparatus 200.

The display device 101 is, for example, a plasma display device or a liquid crystal display, and has a screen 101a on which a picture is displayed. In other words, the display device 101 is an apparatus which displays a GUI, a picture, or a video.

The camera 102 includes an optical system and an imaging sensor, and is provided to the screen 101a. In the present embodiment, the camera 102 is installed such that the optical axis of the optical system and a normal to the screen 101a extend in the same direction on a horizontal plane.

The optical system included in the camera 102 includes a fisheye lens. The camera 102 takes a picture of the user 300 in the vicinity of the screen 101a using the fisheye lens. In a picture taken using the fisheye lens, the distance from the center of the picture is proportional to the angle between the optical axis and the direction from the camera 102.

The gesture recognition apparatus 200 controls the display device 101 based on a gesture operation by a user 300 in the vicinity of the screen 101a. Specifically, the gesture recognition apparatus 200 includes a picture obtainment unit 201, a frame memory 202, a position obtainment unit 203, a direction determination unit 204, a gesture recognition unit 205, and a display control unit 206 as shown in FIG. 2.

The picture obtainment unit 201 obtains picture data indicating a picture generated by the camera 102. Specifically, the picture obtainment unit 201 obtains picture data from the camera 102 each time the camera 102 regularly generates a picture. Then, the picture obtainment unit 201 stores the obtained picture data in the frame memory 202.

The frame memory 202 holds the picture data regularly obtained by the picture obtainment unit 201 until the picture obtainment unit 201 obtains next picture data.

The position obtainment unit 203 obtains position information indicating the direction from the screen 101a or the camera 102 toward the user 300. In the present embodiment, the position obtainment unit 203 obtains position information in the following manner.

First, the position obtainment unit 203 recognizes an image of the user 300 included in the picture of the picture data obtained by the picture obtainment unit 201. For example, the position obtainment unit 203 recognizes an image of the user 300 by comparison with a pre-stored template image. Next, the position obtainment unit 203 obtains position information based on the distance between the position of the image of the recognized user 300 and the center of the picture.

Here, the direction from the screen 101a toward the user 300 is a direction of a straight line connecting a representative point on the screen 101a and the position of the user 300. The representative point on the screen 101a may be the center of the screen 101a or a barycenter thereof.

The direction from the camera 102 toward the user 300 is a direction of a straight line connecting a representative point on the camera 102 and the position of the user 300. The representative point of the camera 102 may be an optical center of the camera 102 or the center of the imaging area.

In the present embodiment, the position information is a divergence indicating divergence of the direction from the screen 101a or the camera 102 toward the user 300 from the frontal direction of the screen 101a or the camera 102. Here, the divergence of the direction from the screen 101a or the camera 102 toward the user 300 from the frontal direction of the screen 101a or the camera 102 indicates divergence of the direction from the screen 101a or the camera 102 toward the user 300 from the optical axis of the camera 102 or a normal to the screen 101a.

The direction determination unit 204 determines an operational direction based on the position information obtained by the position obtainment unit 203. The operational direction is a direction of a movement to be recognized as a gesture operation. Specifically, the direction determination unit 204 determines either a horizontal direction or a vertical direction as the operational direction, based on whether or not a divergence exceeds a threshold.

Here, the horizontal direction is the lateral direction of the screen 101a, and the vertical direction is the top-bottom direction of the screen 101a.

In the present embodiment, the direction determination unit 204 determines the vertical direction as the operational direction when a horizontal divergence exceeds a threshold. On the other hand, the direction determination unit 204 determines the horizontal direction as the operational direction when a horizontal divergence does not exceed the threshold.

Here, the horizontal divergence is a kind of divergence and indicates divergence of the direction from the screen 101a or the camera 102 toward the user from the frontal direction of the screen 101a or the camera 102 on a horizontal plane. That is, the horizontal divergence is a kind of divergence and indicates horizontal divergence of the direction from the screen 101a or the camera 102 toward the user from the optical axis to the camera 102 or the normal to the screen 101a. In the present embodiment, the horizontal divergence is a horizontal angle between the direction from the screen 101a or the camera 102 toward the user and the optical axis of the camera 102 or a normal to the screen 101a.

The gesture recognition unit 205 recognizes, as a gesture operation, a movement of whole or part of the body of the user 300 in an operational direction determined by the direction determination unit 204, with reference to the picture data obtained by the picture obtainment unit 201. For example, the gesture recognition unit 205 recognizes a movement of a palm of the user 300 in an operational direction as a gesture operation. The gesture recognition unit 205 includes a recognition object detection unit 205a and an operation amount measurement unit 205b.

The recognition object detection unit 205a reads picture data stored in the frame memory 202. Then, the recognition object detection unit 205a performs contour extraction, object extraction, and position detection on the picture indicated by the read picture data to detect the position of a part to be recognized as the gesture operation (for example, whole or part of a body or an object held in a hand of a user, hereinafter simply referred to as a "gesture recognition part").

The operation amount measurement unit 205b receives the position of the gesture recognition part from the recognition object detection unit 205a. Next, the operation amount measurement unit 205b measures a gesture operation amount in the operational direction determined by the direction determination unit 204, based on a difference of the received position of the gesture recognition part from the position of the gesture recognition part detected in the immediately preceding picture. Then, the operation amount measurement unit 205b calculates a scroll amount to be reflected from the gesture operation amount on a GUI.

The display control unit 206 controls the display device 101 based on the gesture operation recognized by the gesture recognition unit 205. In the present embodiment, the display control unit 206 receives the scroll amount from the operation amount measurement unit 205b. Next, the display control unit 206 integrates the scroll amount with other information such as information provided from a running application to generate GUI data. Then, the display control unit 206 transmits the resulting GUI data to the display device 101 in a form of a control signal.

The following describes operations of the gesture recognition apparatus in the above configuration, with reference to FIG. 3 to FIG. 5B. Since the direction from the screen 101a and the direction from the camera 102 in the present embodiment coincide on a horizontal plane, the following description focuses on the direction from the camera 102.

Figure 3:
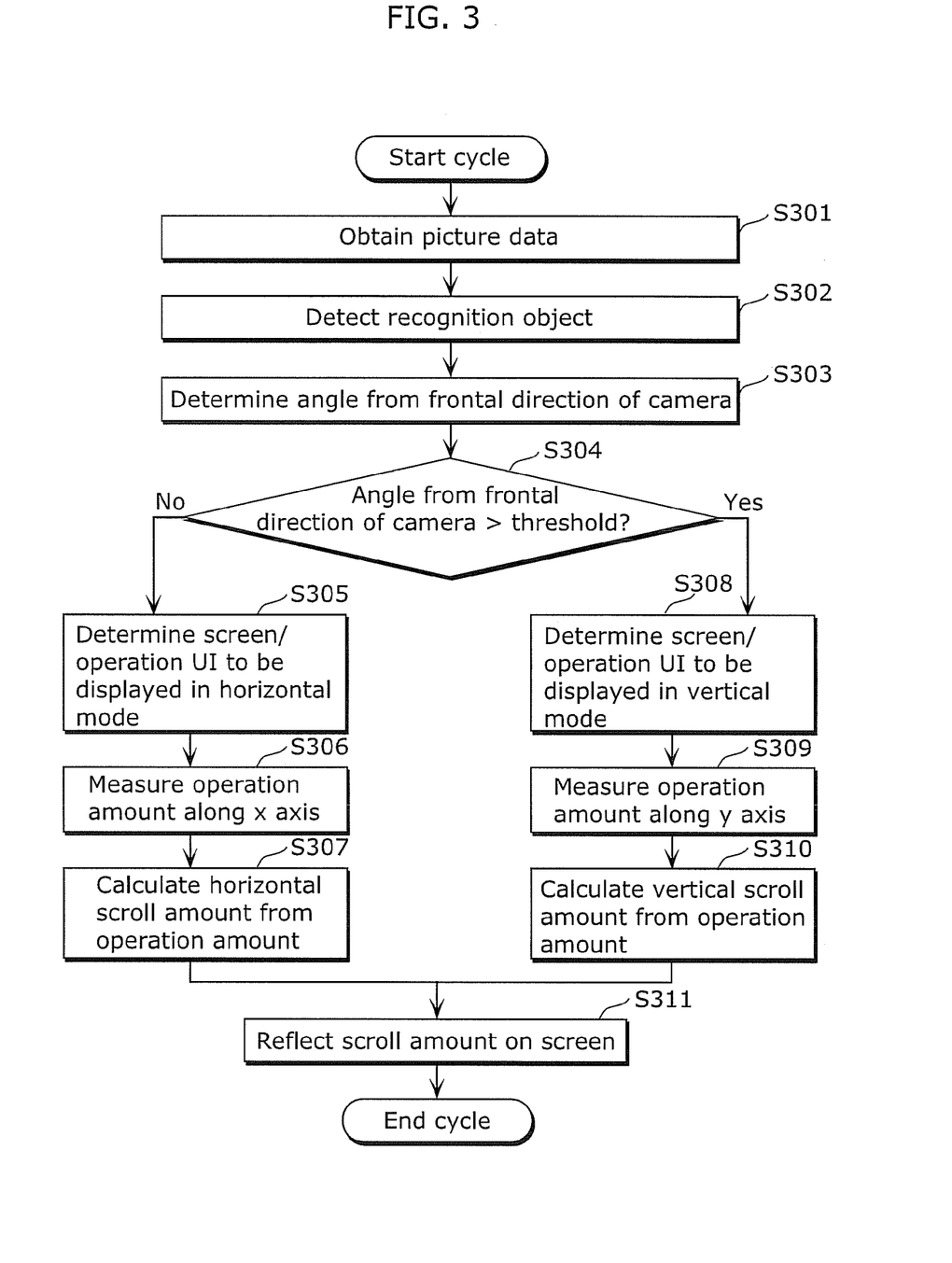
FIG. 3 is a flowchart showing operations of the gesture recognition apparatus according to the embodiment of the present invention.
Figure 4:
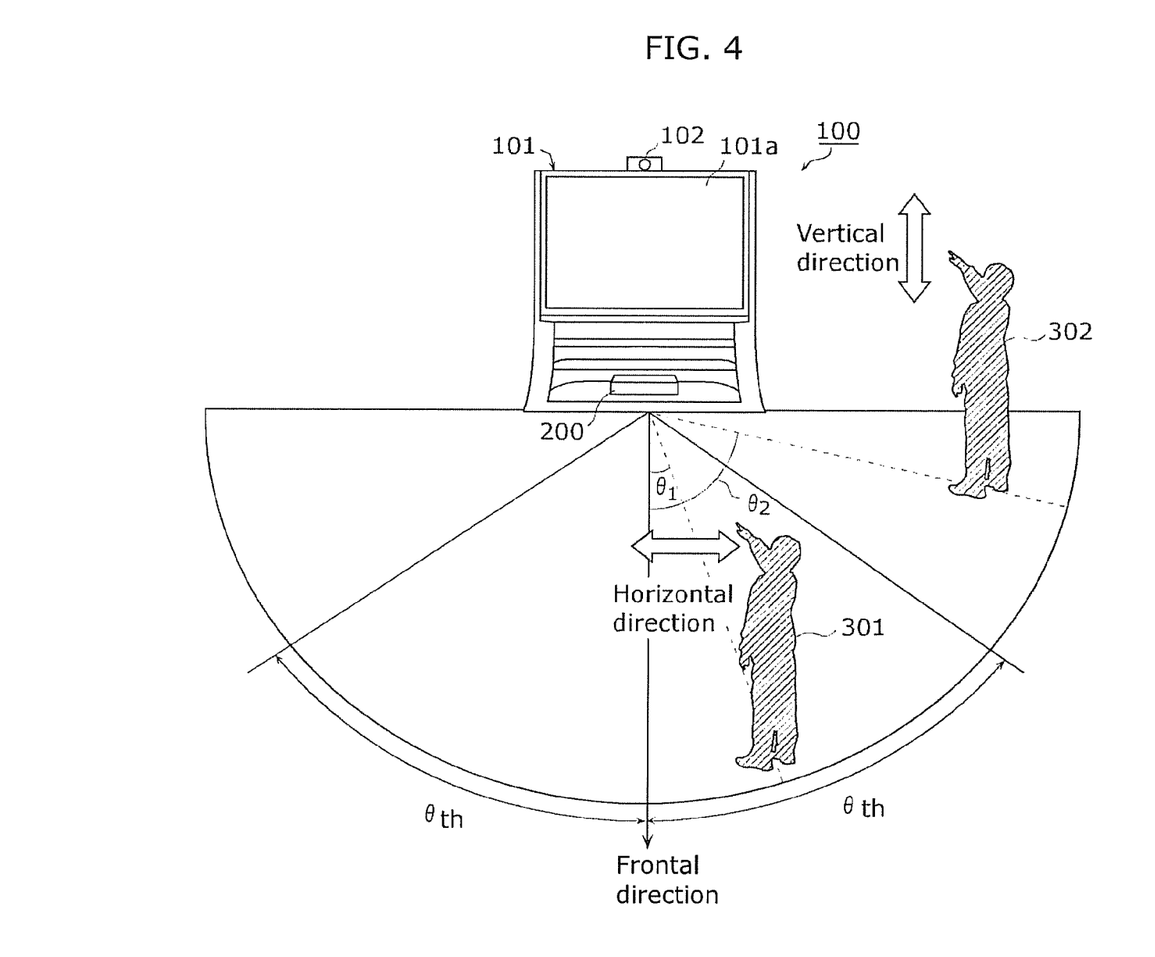
FIG. 4 illustrates operations of the gesture recognition apparatus according to the embodiment of the present invention.
Figure 5A:
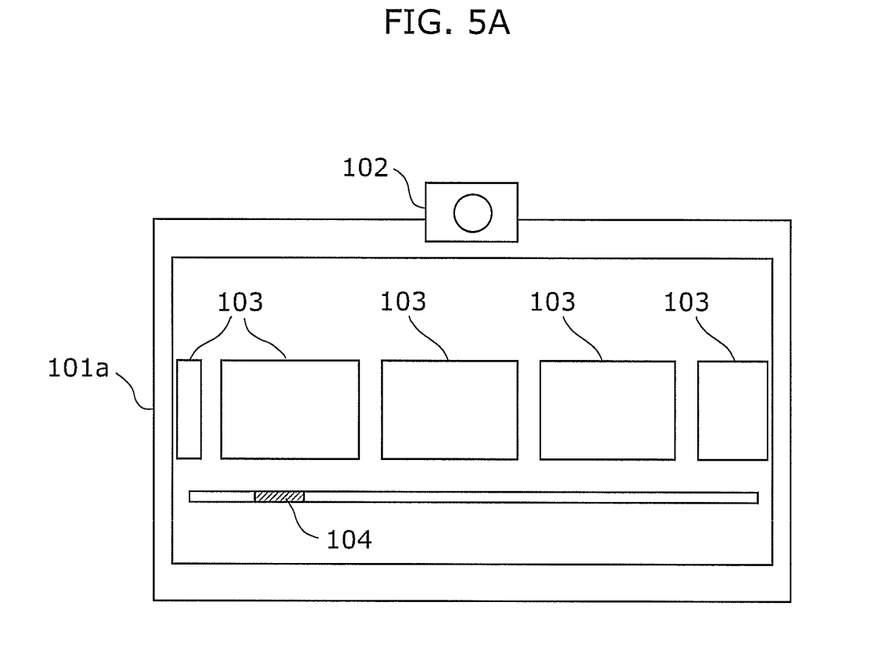
FIG. 5A illustrates a GUI displayed on a screen according to the embodiment of the present invention.
Figure 5B:
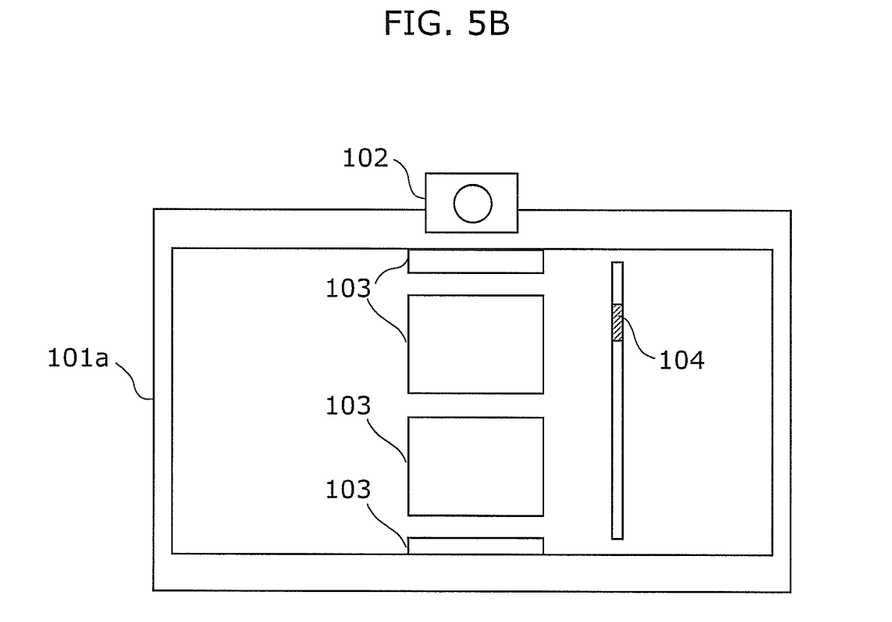
FIG. 5B illustrates a GUI displayed on a screen according to the embodiment of the present invention.

FIG. 3 is a flowchart showing operations of the gesture recognition apparatus according to the embodiment of the present invention. FIG. 4 illustrates the operations of the gesture recognition apparatus according to the embodiment of the present invention. FIG. 5A and FIG. 5B illustrate the GUI displayed on the screen according to the embodiment of the present invention.

First, the picture obtainment unit 201 obtains picture data from the camera 102 (S301). The obtained picture data is stored in the frame memory 202.

Subsequently, the position obtainment unit 203 reads the picture data from the frame memory 202 and recognizes an image of the user 300 in the picture indicated by the read picture data (S302).

The position obtainment unit 203 determines, as a horizontal divergence, a horizontal angle of the position of the recognized image of the user 300 on the picture from the frontal direction of the camera 102 (S303). Here, the picture taken by the camera 102 using a fisheye lens (hereinafter referred to as a "fisheye picture") is effectively used in the determination. In a fisheye picture, the distance from the center of the picture to an image of a measurement object is proportional to the angle of the direction from the camera 102 toward the measurement object from the frontal direction of the camera 102. The position obtainment unit 203 therefore determines angles from the frontal direction of the camera 102 using proportional constants derived from the properties of the fisheye lens.

Subsequently, the direction determination unit 204 determines whether or not the determined angle exceeds a predetermined threshold (S304). Specifically, the direction determination unit 204 determines whether or not the angle determined by the position obtainment unit 203 exceeds an angle $\theta_{th}$ (a threshold) from the frontal direction of the camera 102 as shown in FIG. 4.

When the determined angle from the frontal direction of the camera 102 does not exceed the threshold (No in S304), the direction determination unit 204 determines that the operational mode is to be set to a horizontal mode (S305). Here, the horizontal mode indicates that the operational direction is the horizontal direction. Specifically, in the horizontal mode, a user operates a scroll application (for example, a picture viewer application) on the screen by a gesture operation in a horizontal direction. In addition, the GUI displayed on the screen 101a in the horizontal mode is designed for the horizontal direction in order to support gesture operations in the horizontal direction.

In other words, the direction determination unit 204 determines the horizontal direction as the operational direction when the horizontal divergence does not exceed the threshold. In the case of the user 301 shown in FIG. 4, the direction determination unit 204 determines the horizontal direction as the operational direction because an angle $\theta_1$, which is the horizontal divergence for the user 301, does not exceed the angle $\theta_{th}$ (the threshold).

Subsequently, the operation amount measurement unit 205b measures an operation amount of the horizontal gesture operation (S306). Then, the operation amount measurement unit 205b calculates a horizontal scrolling amount from the measured operation amount (S307).

On the other hand, when the determined angle from the frontal direction of the camera 102 exceeds the threshold (Yes in S304), the direction determination unit 204 determines that the operational mode is to be set to a vertical mode (S308). Here, the vertical mode indicates that the operational direction is the vertical direction. Specifically, in the vertical mode, a user operates a scroll application (for example, a picture viewer application) on the screen by a gesture operation in a vertical direction. In addition, the GUI displayed on the screen 101a in the vertical mode is designed for the vertical direction in order to support gesture operations in the vertical direction.

In other words, the direction determination unit 204 determines the vertical direction as the operational direction when the horizontal divergence exceeds the threshold. In the case of the user 302 shown in FIG. 4, the direction determination unit 204 determines the vertical direction as the operational direction because an angle $\theta_2$, which is the horizontal divergence for the user 302, exceeds the angle $\theta_{th}$ (the threshold).

Subsequently, the operation amount measurement unit 205b measures an operation amount of the vertical gesture operation (S309). Then, the operation amount measurement unit 205b calculates a vertical scrolling amount from the measured operation amount (S310).

Finally, the display control unit 206 generates a GUI on which the horizontal mode or the vertical mode determined in S305 or S308 and the scroll amount calculated in S307 or S310 are reflected and displays the resulting GUI on the display device 101 (S311).

For example, when the operation mode is determined to be the horizontal mode, the display control unit 206 displays, on the display device 101, a GUI in which the objects 103 are horizontally scrolled as shown in FIG. 5A. In addition, the display control unit 206 moves a knob 104 along a horizontal scroll bar according to the calculated scroll amount and displays the objects 103 on the screen 101a according to the position of the knob 104 on the scroll bar. In other words, the display control unit 206 horizontally scrolls the objects 103 according to the scroll amount.

On the other hand, when the operation mode is determined to be the vertical mode, the display control unit 206 displays, on the display device 101, a GUI in which the objects 103 are vertically scrolled as shown in FIG. 5B. In addition, the display control unit 206 moves a knob 104 along a vertical scroll bar according to the calculated scroll amount and displays the objects 103 on the screen 101a according to the position of the knob 104 on the scroll bar. In other words, the display control unit 206 vertically scrolls the objects 103 according to the scroll amount.

In this manner, the gesture recognition apparatus 200 repeats a cycle of the above process steps at the same rate as a frame rate of the camera 102 so that the operational direction is determined based on the direction from the screen 101a or the camera 102 toward the user. As a result, the gesture recognition apparatus 200 have high operability regardless of the position of the user.

Specifically, the gesture recognition apparatus 200 can determine either the horizontal direction or the vertical direction as the operational direction based on whether or not the divergence exceeds the threshold, so that the operational direction is set appropriately for the user located not right in front of the screen 101a or the camera 102 and thus the operability is increased.

Furthermore, the gesture recognition apparatus 200 determines the vertical direction as the operational direction when the horizontal divergence exceeds the threshold, so that a user viewing the screen from a position horizontally away from the screen and oblique thereto can perform a gesture operation without difficulty. In addition, since the gesture recognition apparatus 200 determines not the horizontal direction but the vertical direction as the operational direction when the user is horizontally away from a position right in front of the camera 102, deterioration of accuracy in recognition of a gesture operation is avoided, and operability is increased.

In addition, since the gesture recognition apparatus 200 obtains a picture taken using a fisheye lens, the picture is usable both for recognition of a gesture operation and obtainment of a direction from the camera or the screen toward the user. In other words, the gesture recognition system 100 can be configured simply because the gesture recognition system 100 does not need an additional camera or an additional position sensor to obtain position information.

Furthermore, because the operational direction for gesture operations and the scroll direction coincide, operability of the gesture recognition apparatus 200 is increased for scrolling operations by gesture operations.

The operational direction in the present embodiment determined by the direction determination unit 204 based on the horizontal divergence may be determined base on a vertical divergence instead. Specifically, the direction determination unit 204 determines the horizontal direction as the operational direction when a vertical divergence exceeds a threshold. In this configuration, the gesture recognition apparatus 200 determines the horizontal direction as the operational direction when the vertical divergence exceeds the threshold, so that a user viewing the screen from a position vertically away from the screen 101a and oblique thereto can perform a gesture operation without difficulty. In addition, since the gesture recognition apparatus 200 determines not the vertical direction but the horizontal direction as the operational direction when the user is vertically away from a position right in front of the camera 102, deterioration of accuracy in recognition of a gesture operation is avoided and operability is increased.

Here, the vertical divergence is a kind of divergence and indicates divergence of the direction from the screen 101a or the camera 102 toward the user from the frontal direction of the screen 101a or the camera 102, on a vertical plane orthogonal to a horizontal plane and the screen 101a or the imaging area of the camera 102. That is, the vertical divergence is a kind of divergence and indicates vertical divergence of the direction from the screen 101a or the camera 102 toward the user from the optical axis to the camera 102 or the normal to the screen 101a. For example, the vertical divergence is a vertical angle between the direction from the screen 101a or the camera 102 toward the user and the optical axis of the camera 102 or a normal to the screen 101a.

Figure 6:
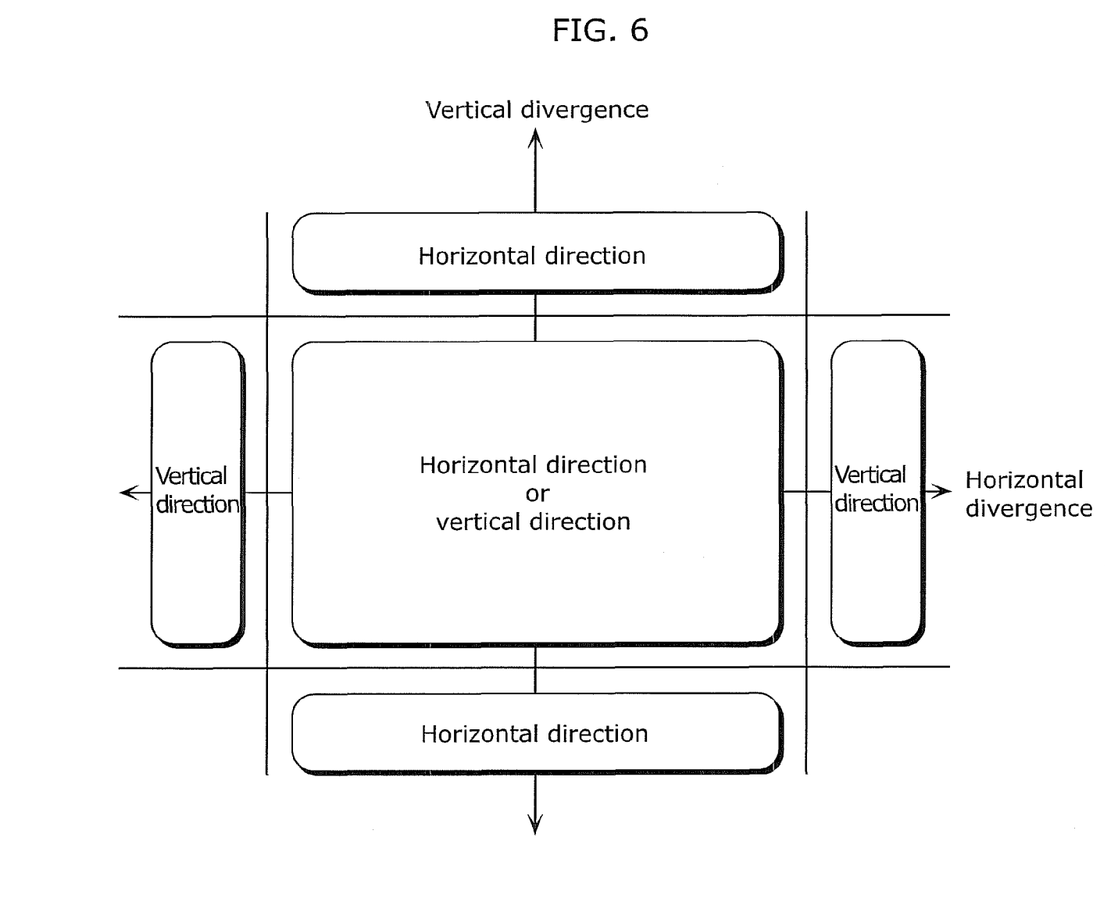
FIG. 6 illustrates another example of a process for determining of direction according to the embodiment of the present invention.

In addition, the operational direction may be determined by the direction determination unit 204 base on both a horizontal divergence and a vertical divergence as shown in FIG. 6. FIG. 6 illustrates another example of a process for direction determination according to the embodiment of the present invention.

Specifically, the direction determination unit 204 determines the vertical direction as he operational direction when a horizontal divergence exceeds a threshold, and the horizontal direction as the operational direction when a vertical divergence exceeds a threshold. The direction determination unit 204 may determine either the horizontal direction or the vertical direction as the operational direction when neither the horizontal divergence nor the vertical divergence exceeds the respective thresholds. In this case, the direction determination unit 204 may determine the operational direction based on, for example, the shape of the screen 101a. For example, when the screen 101a is longer in the horizontal direction than in the vertical direction, the direction determination unit 204 may determine the horizontal direction as the operational direction.

(Variation 1)

The following describes Variation 1 of the above embodiment.

A camera 102 according to Variation 1 is different from the camera 102 according to the above embodiment in that the camera 102 according to Variation 1 is a three-dimensional camera capable of recognition of a wider variety of gesture operations.

The three-dimensional camera is capable of obtaining depth information in addition to two-dimensional pictures taken by ordinary cameras. There are a variety of applicable methods of obtaining depth information, and the three-dimensional camera according to Variation 1 may obtain depth information by any of the methods. For example, a three-dimensional camera uses a built-in light-emitting diode to radiate infrared light, calculates distances in depth based on differences in round-trip times or phases of the infrared light reflected from objects to be imaged, and represents the distances by color shading.

The following describes a problem with the case where such a three-dimensional camera is used in the gesture recognition system.

When a three-dimensional camera is used, gesture operations need to be three-dimensionally recognized by a gesture recognition unit 205. However, there is a problem that there is no applicable method of detecting a movement parallel to a screen as a gesture operation with a small processing load and high accuracy in recognition of an operation amount.

Figure 7:
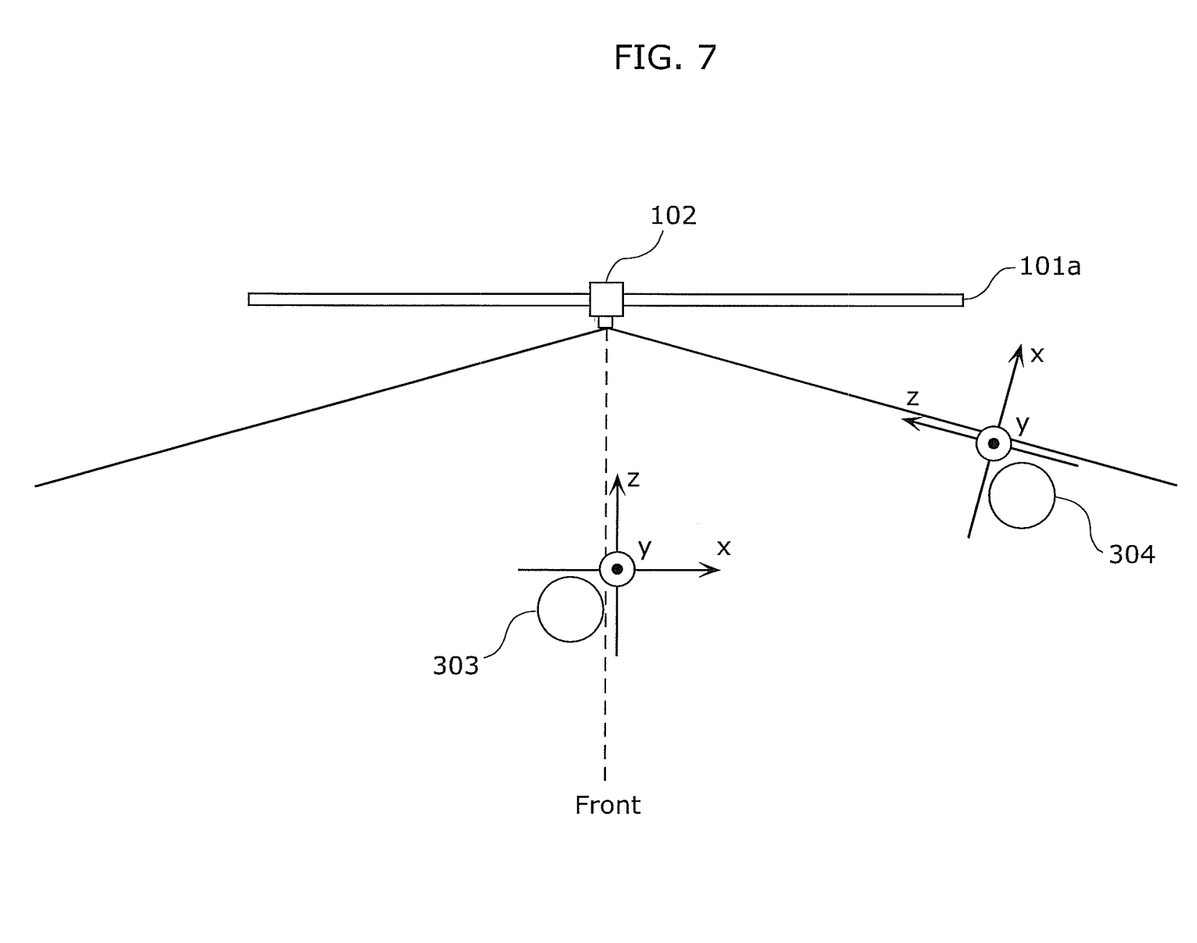
FIG. 7 shows a relationship between a user performing a gesture operation and camera recognition axes.

The following describes a reason for the problem. FIG. 7 shows a relationship between a user performing a gesture operation and camera recognition axes, illustrating an overhead view of a screen, a camera, and users. When recognition of a gesture operation is performed on a picture taken by the camera 102 (a three-dimensional camera) installed on the screen 101a, the gesture recognition apparatus 200 sets z axes along directions from the camera 102 toward a user 303 and a user 304. Therefore, an x axis orthogonal to the z axis for the user 304, who is not right in front of the camera 102, is set to be along a direction crossing the screen 101a as shown in FIG. 7.

First, in the case where the gesture recognition apparatus 200 recognizes a horizontal gesture operation parallel to the screen 101a using a conventional technique, the processing load is large in comparison with processing of a two-dimensional picture because the gesture recognition apparatus 200 decomposes the gesture operation into movements along three axes (x axis, y axis, and z axis) in order to handle a three-dimensional picture.

In a possible method of recognizing a gesture operation conceived to address the problem, a gesture operation is recognized only in the x-axis direction when only horizontal operations are necessary (for example, when a picture viewer application is running). However, in this method, when the user 304 located not right in front of the camera 102 makes an operation parallel to the screen 101a, the amount of the operation recognizable as a movement component in the x axis direction (measured in the number of pixels in the camera) is so small that the scroll amount available for the user 304 is small in comparison with the scroll amount available for the user 303. This problem can be solved by correction based on the angle between the camera recognition axes for the user 303 and the camera recognition axes for the user 304 so as to allow the user 304 to operate by the same scroll amount as the user 303. However, in this case, the number of camera pixels for the same operation is smaller for the user 304 so that the gesture operation by the user 304 is discretely recognized with degraded accuracy. As a result, for example, the user 304 cannot perform a delicate operation as intended.

On the other hand, the gesture recognition apparatus 200 according to Variation 1 determines the vertical direction as the operational direction in the same manner as in the above embodiment when the horizontal divergence for the user 304 exceeds a threshold, and thereby such deterioration in recognition accuracy of gesture operations is prevented. In addition, the gesture recognition apparatus 200 can recognize a gesture operation only in a y-axis direction when the vertical direction is determined as the operational direction, so that increase in load processing is also prevented.

(Variation 2)

The following describes Variation 2 of the above embodiment. A display control unit 206 according to Variation 2 displays position information on the display device 101.

Figure 8:
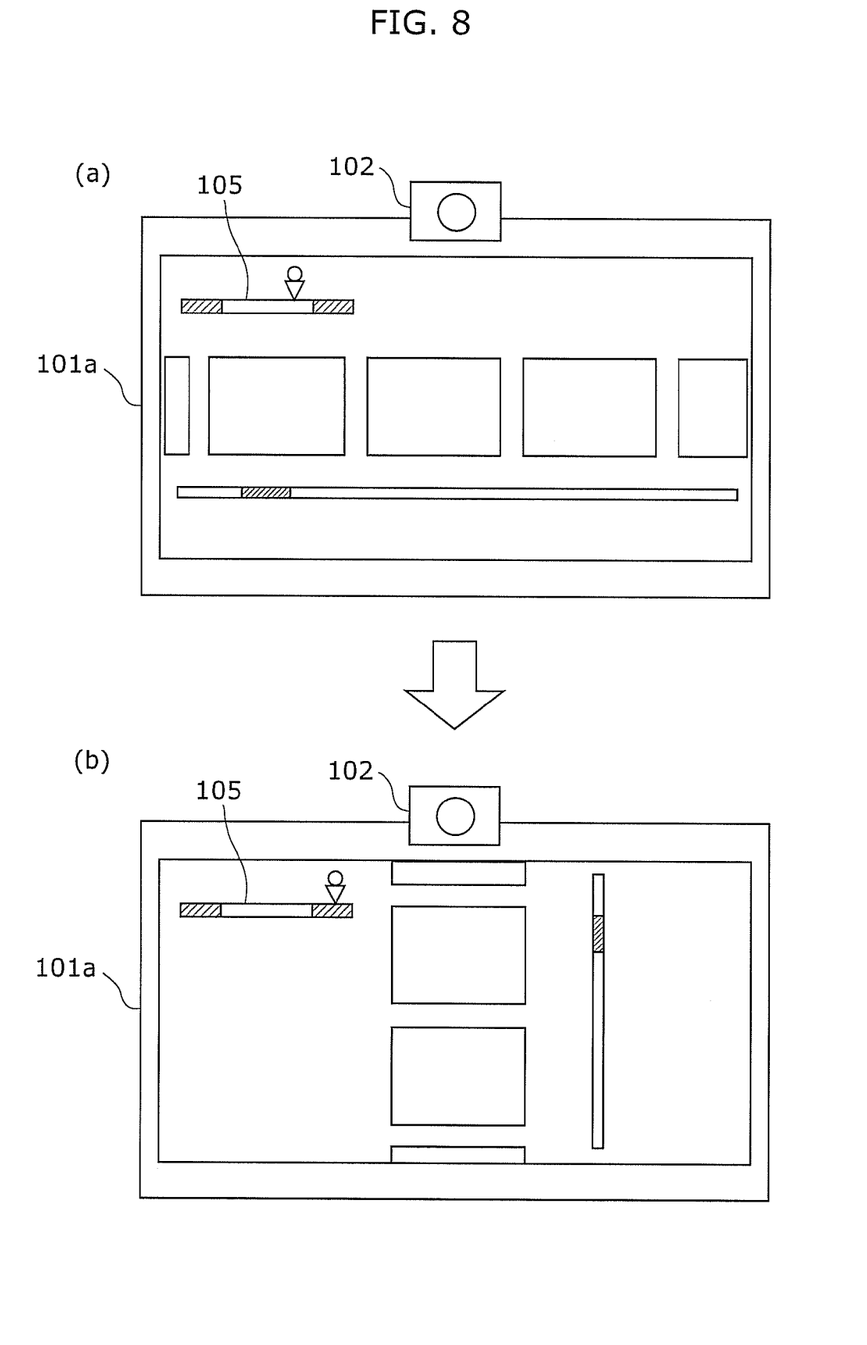
FIG. 8 shows an example display of position information according to Variation 2 of the embodiment of the present invention.

FIG. 8 shows an example display of position information according to Variation 2 of the embodiment of the present invention.

The position information 105 indicates the direction from the screen 101a or the camera 102 toward a user. In FIG. 8, the regions in the position information 105 without hatching indicate that the operational direction is set to the horizontal direction. In FIG. 8, the region in the position information 105 with hatching indicates that the operational direction is set to the vertical direction.

In FIG. 8, the user moves from a position for which the operational direction is set to the horizontal direction (see (a) of FIG. 8) to a position for which the operational direction is set to the vertical direction (see (b) of FIG. 8).

The user can foresee when the operational direction will change by seeing the displayed position information, so that the user can perform operations without feeling changes in operational direction abrupt.

The GUI is preferably controlled by the display control unit 206 such that the GUI gradually changes between (a) and (b) of FIG. 8 in an animation. This prevents the user also from feeling changes of the GUI abrupt.

The present invention is not limited to the present embodiment and the variations thereof based on which the gesture recognition apparatus 200 according to an aspect of the present invention is described as above. Variations of the embodiment which would occur to those skilled in the art and embodiments in which the constituent elements in the present embodiment or the variations thereof, are also within the scope of the present invention.

For example, the fisheye lens included in the camera 102 in the present embodiment and the variations is not always necessary for the present invention. Even when the camera 102 does not include a fisheye lens, the position obtainment unit 203 can obtain the direction from the camera 102 toward a user based on the position of the user's image on a picture. For example, the position obtainment unit 203 obtains a horizontal component of the distance from the center of the picture to the image of the user thereon as a horizontal divergence.

In addition, it is not always necessary for the position obtainment unit 203 to obtain position information from a picture by the camera 102. For example, the position obtainment unit 203 may obtain position information from a position sensor attached to a user, a sheet pressure sensor on the floor, or a ceiling camera.

The camera 102 is not always necessarily installed in the manner such that the optical axis of the optical system of the camera 102 and the normal to the screen 101a coincide on a horizontal plane as described in the present embodiment and the variations thereof. Alternatively, the camera 102, which is installed on the screen 101a as described above, may be installed separately from the screen 101a. Even when the optical axis of the optical system of the camera 102 and the normal to the screen 101a do not coincide, the gesture recognition apparatus 200 can have increased operability by determining the operational direction based on the direction from one of the screen 101a and the camera 102 toward the user.

The frame memory 202 included in the gesture recognition apparatus 200 in the present embodiment and the variations is not always necessary for the present invention.

Although the vertical direction and the horizontal direction either of which the gesture recognition apparatus 200 determines as the operational direction in the present embodiment and the variations thereof, the operational direction is not limited to these directions. For example, the gesture recognition apparatus 200 may determine an oblique direction as the operational direction when both a vertical divergence and a horizontal divergence exceed thresholds.

Although the display control unit 206 scrolls objects on the display in the present embodiment and the variations thereof, it is not always necessary for the display control unit 206 to scroll objects. For example, the display control unit 206 may scroll a single object too large to fit in the screen 101a.

The display control unit 206 may simply shift an object in the operational direction instead of scrolling the object. For example, the display control unit 206 may simply shift an object indicating a present sound volume level in the operational direction. In this case, the display control unit 206 changes sound volume according to the position of the shifted object. Here, it is not necessary that the gesture recognition unit 205 measures a scroll amount. The gesture recognition unit 205 may only recognize a gesture operation.

It is not always necessary for the display control unit 206 to display an object on the screen 101a. For example, the display control unit 206 may change only sound volume or picture quality (such as brightness or contrast) of the display device 101. In other words, the display control unit 206 may control the display device 101 based on the gesture operation.

It is to be noted that the direction determination unit 204 in the present embodiment preferably determines the threshold for the divergences depending on accuracy in recognition of a gesture operation. In other words, the direction determination unit 204 in the above embodiment preferably determines the threshold for the divergence such that the threshold dynamically changes depending on accuracy in recognition of a gesture operation. For example, the direction determination unit 204 in the above embodiment preferably determines the threshold for the divergence such that the threshold for the divergence increases as accuracy in recognition of a gesture operation becomes higher.

Accuracy in recognition of a gesture operation depends on a picture. For example, when gesture operation recognition is performed on a picture taken by a two-dimensional camera, accuracy in recognition of a gesture operation depends on brightness of the picture or color difference between a part with which an operator perform an operation and the background. In other words, the direction determination unit 204 can determine a threshold for divergence according to brightness of the picture or color difference between the part with which an operator performs an operation and the background.

When gesture recognition is performed using a depth map sensor, accuracy in recognition of a gesture operation depends on the amount of noise at the time when the depth is measured. The amount of noise depends on the amount of light of a wavelength used for the depth measurement in ambient light. In addition, the amount of noise depends on also on the background. For example, the amount of noise is large when the background is frosted glass. In other words, the direction determination unit 204 can determine a threshold for divergence according to the amount of noise at the time when the depth is measured.

A threshold for the divergence is thus determined according to accuracy in recognition of a gesture operation so that operability can be increased. For example, when operability is higher for the horizontal direction than for the vertical direction, a threshold can be determined such that the horizontal direction is determined as the operational direction as far as accurate recognition is possible. As a result, the operability is increased.

Part or all of the elements constituting the gesture recognition apparatus 200 according to the present embodiment may be configured as a single System-LSI (Large-Scale Integration). For example, the gesture recognition apparatus 200 may be a system LSI including the picture obtainment unit 201, the direction determination unit 204, the gesture recognition unit 205, and the display control unit 206.

The system LSI is a super-multifunctional LSI manufactured by integrating constituent units on a single chip, and is specifically a computer system including a microprocessor, a read-only memory (ROM), and a random-access memory (RAM). The RAM stores a computer program. The microprocessor operates according to the computer program so that the system LSI can perform its function.

The integrated circuit described as a system LSI above may be referred to as an IC, an LSI, a super LSI or an ultra LSI depending on the degree of integration. The method of forming integrated circuitry is not limited to use of such LSIs. Dedicated circuitry or a general-purpose processor may be used instead. Also applicable is a field programmable gate array (FPGA), which allows post-manufacture programming, or a reconfigurable processor LSI, which allows post-manufacture reconfiguration of connection and setting of circuit cells therein.

Furthermore, in the event that an advance in or derivation from semiconductor technology brings about an integrated circuitry technology whereby an LSI is replaced, functional blocks may be obviously integrated using such new technology. The application of biotechnology or the like is possible.

The present invention may be implemented as a display device including the gesture recognition apparatus 200 according to the present embodiment. Furthermore, the present invention may be implemented as a gesture recognition system including the gesture recognition apparatus 200, the display device 101, and the camera 102 according to the present embodiment. In this case, the display device 101 may be a projector which projects pictures on the screen 101a. In other words, the screen 101a may not be included in the display device 101.

The present invention may be implemented not only as the gesture recognition apparatus including such characteristic processing units but also as a method of gesture recognition including steps corresponding to the characteristic processing units included in the gesture recognition apparatus. Furthermore, the present invention may be implemented as a computer program which causes a computer to perform the characteristic steps included in the method of gesture recognition. It is obvious that such a computer program can be distributed as a computer-readable recording medium such as a compact disc read-only memory (CD-ROM) or a communication network such as the Internet.

INDUSTRIAL APPLICABILITY

The gesture recognition apparatus according to an aspect of the present invention is applicable as a technique for operating a display device based on a recognition of movement of whole or part of the body of a user.

REFERENCE SIGNS LIST

100 Gesture recognition system
101 Display device
101a Screen
102 Camera
200 Gesture recognition apparatus
201 Picture obtainment unit
202 Frame memory
203 Position obtainment unit
204 Direction determination unit
205 Gesture recognition unit
205a Recognition object detection unit
205b Operation amount measurement unit
206 Display control unit
300, 301, 302, 303, and 304 User

The invention claimed is:

1. A gesture recognition apparatus which controls a display device based on a gesture operation performed by a user in a vicinity of a screen, said gesture recognition apparatus comprising:
a picture obtainment unit configured to obtain a picture of the vicinity of the screen;
a direction determination unit configured to determine an operational direction based on position information indicating a direction from the screen or said picture obtainment unit toward the user, the operational direction being a direction of a movement to be recognized as the gesture operation;
a gesture recognition unit configured to recognize, as the gesture operation, a movement of whole or part of a body of the user with reference to the picture obtained by said picture obtainment unit, the movement being in the operational direction determined by said direction determination unit; and
a display control unit configured to control the display device based on the gesture operation recognized by said gesture recognition unit,
wherein the picture is taken by a camera,
said gesture recognition apparatus further comprises a position obtainment unit configured to obtain, as the position information, a divergence of a direction from the screen or the camera toward the user from an optical axis of the camera or a normal to the screen, and
said direction determination unit is configured to determine either a horizontal direction or a vertical direction as the operational direction based on whether or not the divergence exceeds a threshold.

2. The gesture recognition apparatus according to claim 1, wherein the divergence indicates a horizontal divergence which is a divergence on a horizontal plane, and
said direction determination unit is configured to determine the vertical direction as the operational direction when the horizontal divergence exceeds the threshold.

3. The gesture recognition apparatus according to claim 1, wherein the divergence indicates a vertical divergence which is a divergence on a vertical plane orthogonal to a horizontal plane and the screen or an imaging surface of the camera, and
said direction determination unit is configured to determine the horizontal direction as the operational direction when the vertical divergence exceeds the threshold.

4. The gesture recognition apparatus according to claim 1, wherein said direction determination unit is configured to determine the threshold depending on accuracy in recognition of the gesture operation.

5. The gesture recognition apparatus according to claim 1, wherein the camera has an optical system including a fisheye lens, and
said position obtainment unit is configured to recognize an image of the user included in the picture obtained by said picture obtainment unit, and obtain the position information based on a distance between a position of the image of the user and a center of the picture.

6. The gesture recognition apparatus according to claim 1, wherein said display control unit is configured to shift an object displayed on the screen in the operational direction, when said gesture recognition unit recognizes the gesture operation.

7. The gesture recognition apparatus according to claim 1, wherein, when a plurality of objects displayed on the screen are scrolled, said display control unit is configured to scroll the objects displayed on the screen in the operational direction.

8. The gesture recognition apparatus according to claim 1, wherein said display control unit is configured to display the position information on the display device.

9. A display device comprising the gesture recognition apparatus according to claim 1.

10. A method of gesture recognition for controlling a display device based on a gesture operation performed by a user in a vicinity of a screen, said method comprising:

obtaining a picture of the vicinity of the screen;

determining an operational direction based on position information indicating a direction from the screen or a position where the picture has been taken toward the user, the operational direction being a direction of a movement to be recognized as the gesture operation;

recognizing, as the gesture operation, a movement of whole or part of a body of the user with reference to the picture obtained in said obtaining, the movement being in the operational direction determined in said determining; and controlling the display device based on the gesture operation recognized in said recognizing, wherein the picture is taken by a camera, said recognizing further comprises obtaining, as the position information, a divergence of a direction from the screen or the camera toward the user from an optical axis of the camera or a normal to the screen, and said determining further comprises determining either a horizontal direction or a vertical direction as the operational direction based on whether or not the divergence exceeds a threshold.

* * * * *